United States Patent [19]

Gillott et al.

[11] 4,188,230

[45] Feb. 12, 1980

[54] SULPHUR CONCRETES, MORTARS AND THE LIKE

[75] Inventors: Jack E. Gillott; Ian J. Jordaan; Robert E. Loov; Nigel G. Shrive, all of Calgary, Canada

[73] Assignee: Sulphur Development Institute of Canada, Calgary, Canada

[21] Appl. No.: 941,732

[22] Filed: Sep. 12, 1978

[51] Int. Cl.² ............................................. C04B 19/06
[52] U.S. Cl. ...................................................... 106/70
[58] Field of Search .......................................... 106/70

[56] References Cited

U.S. PATENT DOCUMENTS

| 3,468,683 | 9/1969 | Montgomery | 106/70 |
| 4,025,352 | 5/1977 | Leutner et al. | 106/70 |

Primary Examiner—James Poer
Attorney, Agent, or Firm—Schwartz, Jeffery, Schwaab, Mack, Blumenthal & Koch

[57] ABSTRACT

Sulphur concretes and mortars are provided which display improved ductility and in which water-resistance is provided in otherwise water-disintegratable compositions due to the presence of swelling clay in the mineral aggregate. The improved properties are obtained by the use of petroleum additives such as crude oil and polyol additives such as glycerol.

48 Claims, 6 Drawing Figures

SULPHUR CONCRETES, MORTARS AND THE LIKE

BACKGROUND OF THE INVENTION (a) Field of the Invention

This invention relates to mouldable compositions and moulded articles based on mineral aggregate and sulphur as well as to processes for their preparation; more especially the invention is concerned with sulphur concrete, sulphur mortar and other sulphur-bound composite materials of improved ductility and/or durability, particularly concretes and mortars wherein the aggregate contains a swelling clay.

(b) Description of the Prior Art

Mixtures of mineral aggregate and sulphur, wherein the sulphur functions as a binder are termed sulphur concretes or sulphur mortars depending on the form of the mineral aggregate.

Articles which may be formed by casting such sulphur concretes include preformed concrete articles conventionally formed from concretes based on a mixture of a hydraulic cement, such as Portland cement, mineral aggregate and water together with various additives. Such articles include paving slabs, structural members, curbing, gutters, pipes and other cast products.

Sulphur mortars may be employed, for example, in the cementing or joining of pipe, bricks and tile, and as coating compositions to provide a protective surface.

Sulphur concretes and mortars display certain advantages, as compared with Portland cement, although they also suffer from certain disadvantages. A particular advantage of the sulphur compositions (concretes and mortars) is that the solidified material can be re-used by heating it so as to re-melt the sulphur. This reduces waste since, for example, an imperfectly cast article can be melted down and recast.

Further sulphur is available in large quantities both as a by-product of oil refining and natural gas processing in the petroleum industry and from mining of sulphur deposits.

Concretes containing sulphur have been described in U.S. Pat. Nos. 3,954,480 and 4,025,352. In U.S. Pat. No. 3,954,480, Inderwick sought to provide concretes of improved strength and durability by employing powdered sulphur in admixture with Portland cement, water and mineral aggregate. In U.S. Pat. No. 4,025,352, Leutner et al sought to provide concretes having improved compressive strength and flexural strength, and improved corrosion characteristics by including dicyclopentadiene in the sulphur-aggregate mixture and controlling the interaction between the sulphur and the dicyclopentadiene.

Sulphur concretes and mortars tend to be very brittle, and there is very little reduction in stiffness as the ultimate load is approached so that failure occurs in the region of the maximum strength of the material. When such failure occurs, crack propagation is very rapid. This behaviour is very different to that of Portland cement, which shows significantly greater ductility.

The brittle nature or low ductility displayed by sulphur concretes and mortars represents a serious deficiency, particularly in comparison with the more conventionally used Portland cement, which has considerably delayed the acceptance of the materials commercially.

Various attempts have been made to improve the ductility of sulphur concretes by plasticizing the sulphur or changing it to a polymeric form. These attempts usually involve the addition of polymeric sulphides or substances which react with elemental sulphur to produce polysulphides in situ. The use of elemental arsenic and phosphorous to produce a rubbery material with sulphur is described in the Journal of Colloid Science, 17, (1962), page 717 by Tobolsky et al. The use of thiokols to plasticize sulphur has been described in The Bulletin of the American Ceramic Society, Vol. 16, No. 11, Nov. 1937, pages 435-438 by Dueker and Schofield and in Advances in Chemistry, Series 110 (Sulphur Research Trends) 1971, pages 201-207 by Dale J. M. The use of unsaturated organic compounds to plasticize sulphur has been described in Advances in Chemistry, Series 140 (New Uses of Sulphur), American Chemical Society, 1971, by Currel et al.

However, Currel et al also reported (see above) as did Blight et al in Advances in Chemistry, American Chemical Society, 1977 ("Preparation and Properties of Modified Sulphur Systems", Sulphur Utilization—A Progress Report), that unless large proportions of the modifier or plasticizer were employed, crystallization of the sulphur in the orthohombic form eventually occurs, with the loss of previous beneficial effects and restoration of the brittle state.

There is thus a need to provide ductile sulphur concretes and mortars, which do not revert to the brittle state.

A further problem with sulphur concretes and mortars exposed to the environment, occurs when the mineral aggregate contains a swelling clay, in that such concretes and mortars disintegrate rapidly when exposed to water or aqueous systems either by direct immersion in the water or by exposure to water in the atmosphere, for example, rain, humidity or melting snow. The problem occurs even with relatively minor amounts of swelling clay in the aggregate, for example, 1.0%, by volume.

Thus mineral aggregates containing swelling clay have either been avoided or careful pre-washing of the aggregate to remove the swelling clay has been necessary.

It would clearly be advantageous to be able to employ a mineral aggregate containing swelling clay, when such aggregate is readily available, for example, in regions where clay occurs naturally in the collected aggregate.

It is an object of this invention to provide sulphur concretes, mortars and coatings of improved ductility.

It is a different object of this invention to provide sulphur concretes, mortars and coatings which have good durability, particularly resistance to disintegration in water, and which employ an otherwise unusable mineral aggregate containing swelling clay.

It is a further object of the invention to provide sulphur concretes, mortars and coatings which have both ductility and durability, particularly resistance to disintegration in water.

It is a still further object of this invention to provide processes for the manufacture of such sulphur concretes, mortars and coatings.

SUMMARY OF THE INVENTION

It has been found that the incorporation into a composition comprising a mixture of sulphur and mineral aggregate, for example, sulphur concretes, mortars and coatings, of certain additives results in compositions which display improved ductility as compared with such compositions without the additives.

It has also been found that the incorporation of certain additives into a composition comprising a mixture of sulphur and mineral aggregate, for example, a sulphur concrete, mortar or coating composition in which the mineral aggregate is contaminated with a swelling clay, results in compositions which display good water resistance and do not disintegrate even when immersed in water for prolonged periods. Without these additives the use of a mineral aggregate contaminated with swelling clay usually results in failure of the sulphur compositions when exposed to wet environments.

Many of the additives found effective for improving ductility are the same as those that improve the water resistance when swelling clay is present in the mineral aggregate. Thus a concrete, mortar or coating with improved ductility and water resistance can be made from mineral aggregate contaminated with swelling clay.

The additives which can be employed to increase the water resistance include crude oil, the resin and oil (maltene) fraction of crude oil, the residuum fraction (maltene and asphaltene fractions) of crude oil, the heavy fractions of crude oil particularly those fractionated above 250° C.; polyols, for example, glycerol; and Varsol (trademark of Humble Oil and Refining Co., for a Petroleum aliphatic Solvent) or other similar products.

In one aspect of the invention there is provided a hot mouldable, ductile construction composition, for example, a concrete, mortar or coating, comprising sulphur and a mineral aggregate.

In another aspect the invention provides a hot-mouldable, water resistant sulphur composition, for example, a concrete, mortar or coating, containing a mineral aggregate contaminated with a swelling clay.

In yet another aspect the invention provides a hot-mouldable, ductile, water resistant sulphur composition for example, a concrete, mortar or coating, which contains a mineral aggregate contaminated with a swelling clay.

In still another aspect the invention provides sulphur concrete articles formed from the hot mouldable concretes.

In a still further aspect the invention provides a remeltable sulphur mortar of improved ductility.

In a still further aspect the invention provides a remeltable, water resistant sulphur mortar of improved ductility, in which the mineral aggregate is contaminated with a swelling clay.

In a still further aspect of the invention there is provided processes for the preparation of moulded, ductile sulphur concrete articles.

In yet another aspect the invention provides processes for the preparation of moulded water-resistant sulphur concrete articles containing a mineral aggregate contaminated with a swelling clay.

Still further the invention provides processes for the preparation of moulded, ductile, water-resistant, sulphur concrete articles containing a mineral aggregate contaminated with a swelling clay.

In a particular embodiment of the processes of the invention the mineral aggregate is pre-soaked with a polyol.

In a different aspect the invention provides a method of rendering a sulphur concrete containing a swelling clay, water-resistant.

In the case of the additives that improve the ductility, the ductility is improved both with mineral aggregates that are free of swelling clay and mineral aggregates that are contaminated with swelling clay.

The terms "hot-mouldable" and "moulded" in this specification embrace sulphur compositions, for example, concretes, mortars and coatings which can be pre-cast into moulds or forms or poured, extruded, trowled, sprayed or otherwise applied in place for in situ installation, when the sulphur is in a molten state below 160° C., as is the case with Portland cement concretes.

Other conventional sulphur modifiers used in the manufacture of sulphur composites, for example, sulphur concretes, can be used in combination with the additives of this invention. It may be desirable to incorporate such modifiers, including plasticizers and fire retardants, to impart special properties for specific applications and end-uses. For example, where plasticization is required such additives as olefinic hydrocarbon polymers (U.S. Pat. No. 4,058,500—Vroom; the disclosure of which is hereby incorporated by reference) and dicyclopentadiene can be used. Also for example where compositions of improved flame resistance are required, fire retardants such as 1,5,9-cyclododecatriene may be added.

DESCRIPTION OF THE PREFERRED EMBODIMENTS

Aggregates

The mineral aggregates in the compositions of the invention may include coarse aggregate, fine aggregate and fines.

Coarse aggregate includes gravel, crushed stone, slag and other material of mineral composition having a particle size of at least 4.75 mm and particularly 1.5 cm to 4 cm.

Fine aggregate includes sand and other material of mineral composition having a particle size of about 150 $\mu$m to about 4.75 mm.

Fines include fly ash, pyrrhotite, crushed shale, illite and other material of mineral composition having a particle size less than about 150 $\mu$m.

Generally speaking sulphur mortars contain no coarse aggregate, whereas sulphur concretes contain a major amount of coarse aggregate. A sulphur concrete should suitably contain as much coarse material as possible so as to occupy the major volume of the concrete, thereby reducing the amount of the more expensive sulphur which is needed.

The mineral aggregate may also comprise natural soil, in which case a sulphur/soil composition of improved ductility and water resistance could be employed as a base for a paved surface, for example, a road.

The mineral aggregates employed in this invention in the embodiments thereof relating to improved ductility may be either free of swelling clay or contaminated with swelling clay.

Natural soil is in engineering terms understood to be earth material between the earth's surface and the bed rock; as such this includes sub-soil, top soil, humus, garden soil and mixtures of any of the coarse aggregate, fine aggregate and fines, described above, with or without such earth material.

Sulphur Concretes, Mortars and Coatings

The function of the sulphur in the compositions of the invention is as a binder for the mineral aggregate. Since sulphur is more expensive than mineral aggregate, it is desirable to minimize the sulphur content in the composition while providing sufficient sulphur to bind or cement the aggregate.

In a sulphur concrete the mineral aggregate packs closely together to minimize the free volume (i.e. the volume of the concrete unoccupied by aggregate).

In addition to binding or cementing the aggregate it is desirable that the sulphur be present in an amount sufficient to fill the free volume between the aggregate so as to provide a substantially void-free concrete. Voids in the concrete represent weak points which deleteriously affect the strength of the concrete.

Of course, it is impracticable on a commercial scale to attain a completely void-free concrete, however, the presence of 1 to 10%, by volume, of voids in the sulphur concrete is generally acceptable and the volume of voids can be limited to about 1 to about 5%.

The sulphur compositions of the invention need not contain all three classes of aggregate, and, as indicated previously, mortars will generally contain no coarse aggregate. However, while acceptable concretes might be obtained containing only one or two of these three classes of aggregate, the preferred concretes will contain all three classes so as to obtain the closest packing and reduce the void filling volume of sulphur.

The content and form of coarse aggregate in the sulphur composition will determine if the composition is most suitably considered a concrete, mortar or coating. If, for example, the content of coarse aggregate is relatively low and the particle size is at the lower end close to the fine aggregate range, then the sulphur composition may be more appropriately employed as, and considered as, a mortar, even though it contains coarse aggregate.

Similarly if the particle size of the fine aggregate is at the low end of the range it may be satisfactory to omit fines from the composition thereby reducing the cost since the fines are relatively expensive.

The mineral aggregate is composed of one or more of coarse aggregate, fine aggregate and fines, or soil or soil mixed with mineral aggregate. Suitably the mineral aggregate may comprise 0 to 100% of each of coarse aggregate, fine aggregate, fines and soil, to a total of 100%. In considering the different classes of sulphur composition hereafter, reference to the % sulphur content is to be understood as the content of sulphur and additive in the sulphur composition.

Concretes

Sulphur concretes most suitably include a mixture of coarse aggregate, fine aggregate and fines as the mineral aggregate. Suitably the mineral aggregate may comprise 10 to 90%, preferably 15 to 80% and more preferably 25 to 55%, by weight of coarse aggregate; 5 to 90% preferably 5 to 85%, more preferably 30 to 85%, and most preferably 35 to 60%, by weight of fine aggregate; and 0 to 30%, preferably 0 to 20%, more preferably 5 to 15%, by weight of fines. The aggregate ingredients are selected within these ranges to a total of 100%, based on the total weight of mineral aggregate.

Suitably the sulphur concretes will contain in weight percent, 5 to 90%, preferably 5 to 30% and more preferably about 5 to 20% of sulphur; and 10 to 95%, preferably 70 to 95% and more preferably about 80 to 95% of mineral aggregate to a total of 100%.

Generally it is preferred to have a content of fines, particularly when coarse aggregate is present as in a sulphur concrete. The fines counteract the tendency for segregation of the sulphur from the larger aggregate particles, particularly the coarse aggregate. The fines also act to provide crystal nucleation sites and reduce the occurrence of cavities which develop with shrinkage of the sulphur composition which arises from the change in density of the sulphur on solidifying.

The fine aggregate and fines content affects the workability of the sulphur composition; and in particular improves the workability of the composition. However, too great a content of fine aggregate and/or fines will render the composition stiff so that it is more difficult to work.

When the mineral aggregate is contaminated with a swelling clay, the swelling clay may be part of one or more of the coarse aggregate, fine aggregate or fines. The content of swelling clay will depend on the area from which the mineral aggregate is taken. However, even the presence of small amounts of swelling clay can result in disintegration of a sulphur concrete or mortar on exposure to water.

Mineral aggregate available in the Province of Alberta, Canada, may typically contain 0.1% to 5%, more usually 1 to 4%, by weight of swelling clay.

The swelling clay takes up water and swells, and it is believed to be this swelling which brings about the disintegration of sulphur concretes, mortars and coatings that contain swelling clay. The time for disintegration depends on the amount of swelling clay.

All clay minerals are basically hydrous aluminium or occasionally hydrous magnesium silicates, however, not all clay minerals are capable of interlayer swelling. The smectite group which includes montmorillonite, is especially notable for its swelling capacity in water and other liquids. Clays formed from the decomposition of volcanic ash and largely composed of montmorillonite and beidellite are termed bentonite.

Sulphur Mortars

Sulphur mortars most suitably comprise 20 to 60%, more preferably 35 to 50%, by weight of sulphur; and 40 to 80%, more preferably 50 to 75%, by weight of the mineral aggregate, based on the weight of the mortar.

The mineral aggregate is suitably composed of fine aggregate and fines with no coarse aggregate. Generally, the mineral aggregate may comprise 0 to 100%, preferably 30 to 70%, by weight of fine aggregate and 0 to 100%, preferably 30 to 70%, by weight of fines, to a total of 100%, based on the total weight of mineral aggregate.

Sulphur Coatings

Sulphur coatings may be in a sprayable form or in a form for application by other means.

Suitably the coatings may contain 60 to 98%, and preferably 75 to 90%, by weight of sulphur; and 2 to 40%, preferably 10 to 25%, by weight of mineral aggregate in the form of fine aggregate and fines.

Manufacture of Sulphur Concretes, Mortars and Coatings

The sulphur concretes, mortars and coatings of the invention are readily produced by mixing the mineral aggregate with the molten sulphur and introducing the additive at a convenient stage. The mixing is thus carried out at an elevated temperature effective to maintain the sulphur in a molten state and below the temperature at which the sulphur polymerizes to a high viscosity material.

Thus the sulphur is maintained at a temperature in the general range of 115° C. to about 160° C. during mixing. Above 159° C. the sulphur begins to polymerize, while below 115° C. solidification occurs. Within this temperature range sulphur is a low viscosity liquid and can be readily mixed with mineral aggregate.

In a preferred procedure the mineral aggregate is first pre-heated to a temperature in the molten sulphur range i.e., 115° C. to 160° C., preferably below 159° C., more preferably about 120° C. to about 130° C., most preferably about 125° C. The pre-heated mineral aggregate is then mixed, in a suitable mixer, for example, a concrete mixer, with molten sulphur until a substantially homogeneous mixture is obtained; the temperature being maintained throughout the mixing. The hot mix is subsubsequently cast to the desired shape, in the case of a sulphur concrete, or may be used directly, in the case of a mortar. However, sulphur mortars can also be moulded to form articles.

Although conventional aggregate handling techniques may be used it may be advantageous to add the fines after the addition of the molten sulphur to the remaining portion of the mineral aggregate, as this may avoid the formation of a dust composed of the fines.

Pre-heating of the mineral aggregate is desirable to avoid solidification of the molten sulphur by contact with mineral aggregate at a lower temperature, and to reduce the mixing time.

The point of introduction of the additive depends on the additive selected and its intended function.

In the case of providing ductility in the composition the "petroleum" additives are suitably added to the molten sulphur and mixed with the molten sulphur before the molten sulphur is mixed with the aggregate. However, the aggregate, sulphur and additive may be mixed in any order. The mixing time is not critical and will depend on the nature of the mixing apparatus. A minimum mixing time of 2 minutes was employed using a 1.5 cu. ft. Monarch mixer driven by a ⅛ H.P. motor, at 30 cycles per minute (0.5 Hz); however, a shorter minimum mixing time could be employed with a faster mixer.

To impart water resistance, the mix order and mix time may be important. Presently it is preferred, in the case of the "petroleum" additives to mix the aggregate with the additive prior to mixing with the sulphur, however, a degree of water resistance can be achieved with any mix order.

In the case of the polyol additive, for both ductility and water resistance, the mineral aggregate is suitably soaked in the polyol, if necessary in an aqueous solution, particularly when a swelling clay is present, whereafter excess polyol or water is removed by heating the aggregate; this heating can form part of the preheating of the aggregate in the preferred process.

The hot mix could be made in other ways, for example, non-molten sulphur, for example, powdered, crushed, flaked or pelletized sulphur, can be mixed with the mineral aggregate, whereafter the mixture is heated to melt the sulphur. In another common method, for example, non-molten sulphur, for example, powdered, crushed, flaked or pelletized sulphur can be mixed with preheated mineral aggregate whereafter the composition is mixed, the sulphur being melted by the heat of the mineral aggregate. In these cases the "petroleum" additive can be added before or after the addition of the sulphur and before or after the melting of the sulphur when the objective is to improve the ductility of the composition, although the mix order and time may be important when the objective is to impart water resistance. However, in the case of the polyol additive this is still preferably initially incorporated in the aggregate as described above.

Additives

The additives useful in producing water resistance and improved ductility in the sulphur compositions can be broadly classified as "petroleum" additives and polyol additives.

(a) Petroleum Additives

The petroleum additives include crude oil and its residuum, heavy oil and resin fractions or combinations thereof, and Varsol (trademark) and other similar products.

By crude oil is intended unrefined petroleum. The resin and oil (maltene) fraction of crude oil is the pentane soluble fraction of the residuum whereas the pentane insoluble fraction of the residuum is called the asphaltene fraction.

The asphaltene fraction produces only a slight improvement in ductility and probably this is due to the presence of materials from the resin fraction, as a result of imperfect separation, thus if ductility of water resistance are required the asphaltene fraction alone would not be the preferred choice.

It will be recognized that crude oil is a mixture of a variety of gaseous; liquid and solid hydrocarbons including saturated and unsaturated aliphatic hydrocarbons and aromatic hydrocarbons.

More particularly, crude oil is a highly complex mixture of paraffinic, cycloparaffinic (naphthenic), and aromatic hydrocarbons, which contains low percentages of sulphur and trace amounts of oxygen and nitrogen compounds. The relative amounts of the different components of the mixture vary with the source. In the present invention there has been used in particular Alberta crude which is largely aromatic (asphalt base), but all the crude oils contain similar ingredients, only the relative amounts being different.

Typically crude oil is a viscous dark-brown to yellow liquid having an unpleasant odour, having a specific gravity of 0.65 to 1.07 and more usually 0.78 to 0.97, and a Flash point of 20°–90° F.

Crude oils are difficult to characterize and no simple classification based on the properties of the whole crude oil is possible. A significant description of a crude oil requires the hydrocarbon distribution of each fraction of the oil to be determined, however, simple characterizations are of some use in making approximate estimates of the nature of the crude oil.

A frequently quoted index is the "API" (American Petroleum Index) and this may serve as a ranking index for oils of a particular type or area.

In many cases crude oils are classified into three broad groups namely paraffin, intermediate and naphthene base crude oils. The paraffin base oils contain wax, the naphthene base oils contain asphalt and the intermediate base contain both wax and asphalt.

For a given boiling range, naphthene base oils have a low "API" gravity (high density) and paraffin base oils have a high "API" gravity (low density).

The crude oils are also simply classified by the characterization Factor (Watson, Nelson and Murphy), defined as:

$CF = \sqrt[3]{T_B}/S$, $T_B$ = mean b.p. in degrees Rankine
$S$ = s.g. at 60° F.

In general crude oils may be classified according to their Characterization Factor:
paraffinic: 12.2 to 12.4,
intermediate: 11.6 to 12.0,
naphthenic: 11.0 to 11.4,
aromatic: 10.8.

Crude oils from different geographical regions may be classified according to their Characterization Factor:
Mid Continent (North America): 11.8 to 12.1,
Pennsylvania (U.S.A.): 12.2 to 12.5,
Gulf Coast (North America): 11.0 to 11.8,
Middle East: 11.85 to 12.0,
Venezuela (10 to 24 API): 11.4 to 11.7,
Venezuela (25 to 50 API): 11.7 to 11.85.

These properties are described in the Kirk-Othmer Encyclopedia of Chemical Technology.

Crude oil is essentially a raw material taken from the ground and is given no more treatment than is necessary to render it suitable for transport, and for use directly as a refining feedstock. Such minimum treatment involves reducing the vapour pressure; concentration of potentially corrosive acid gases, the water content and the salt content to acceptable levels. Generally the water content is limited to a maximum of 2%, by weight and the salt content is limited to a maximum of 40 p.p.m.

The crude oil is chiefly composed of hydrocarbons including normal and branched paraffins ($C_nH_{2n+2}$) up to $C_{36}$; cycloparaffins or naphthenes which are mainly $C_5$ and $C_6$; and aromatics. The content of different hydrocarbons depends on the geographical origin but all crude oils contain similar hydrocarbons.

Sulphur is present particularly in the form of alkane thiols, alkane sulphides, cyclic thiols and cyclic sulphides. Oxygen is present in the high molecular weight resin and asphaltene fractions and in the form of carboxylic acids and monocyclic naphthenic acids. Nitrogen is present mainly in basic compounds, for example, pyrrole, indole and carbazole compounds. Metals including vanadium, copper, nickel and iron are present in oil-soluble compounds mainly in the asphaltene fraction.

Various crude oils have been successfully employed as additives in the invention. In particular it is found that the heavy or higher boiling fractions of crude oil are especially useful while the lighter fractions tend to have little or no effect.

Preferably the crude oil is used as the additive since fractionating the crude oil to obtain particular fractions increases the costs, crude oil being relatively inexpensive. However, where crude oil fractions are employed it is found preferable to employ those fractionated above 250° C.

The residuum of fractionation of crude oil is also useful.

This residuum remains after fractional distillation at about 400° C. The residuum comprises the resin and oil (maltene) fraction and the asphaltene fraction; the maltene fraction may be employed alone or in admixture with the asphaltene fraction.

It is not clear which of the many ingredients of the crude oil are the active materials in the present invention, however, it appears that active materials useful in the invention occur in the maltene fraction and in the heavy fractions.

In general, while most crude oils appear to be useful in the invention it is preferred to employ those crude oils having a lower paraffin content. Thus the invention is especially concerned with crude oils having a Characterization Factor of up to about 12.

On the other hand simple aromatic compounds, for example, benzene, toluene and xylene do not appear to improve the ductility.

The amount of additive employed in any specific case is somewhat dependent on the content of swelling clay and the required mechanical properties. A crude oil addition of 0.5 to 5%, by weight, based on the weight of sulphur, with an Alberta mineral aggregate which typically contains 0.1 to 5%, by weight, of swelling clay is generally found to produce good water resistance in compositions having sulphur and mineral aggregate contents within the invention. However, when the swelling clay content is deliberately increased by the addition of bentonite, the low amounts of crude oil are no longer fully effective in producing water resistance.

It appears too that the utility of Varsol (trademark) may arise from the presence of contaminants, similar to the maltene fraction of crude oil. The Varsol does not appear to improve the ductility but it does give water resistance when the aggregate contains a swelling clay.

The petroleum additive is suitably employed in an amount of 0.1 to 50%, preferably 0.5 to 20%, more preferably 0.5 to 10%, by weight, based on the weight of sulphur. Amounts of the petroleum additive greater than those specified may be employed, however, they do not result in any further improvement either in water resistance or ductility.

Figure 1:
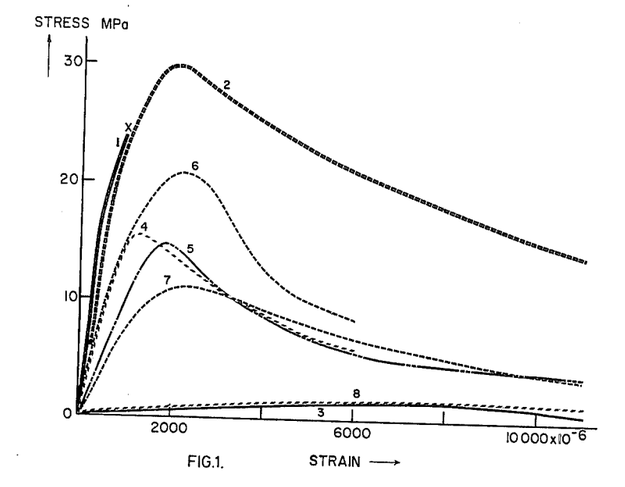
FIG. 1 is a graph illustrating a typical plot of stress against strain for sulphur concretes of improved ductility of the invention, a sulphur concrete without the ductility promoting additive, a Portland cement concrete and an asphalt concrete.
Figure 2:
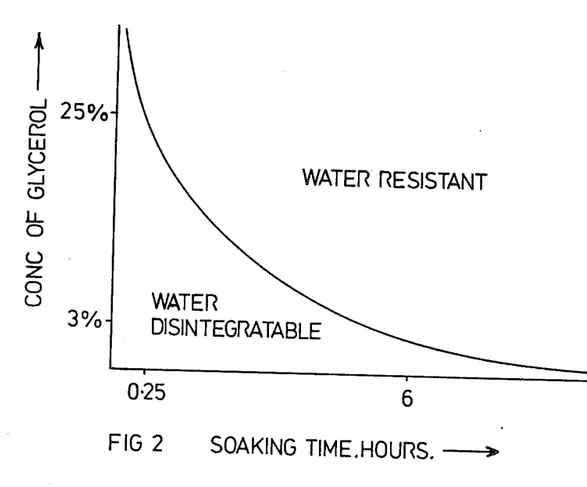
FIG. 2 is a graph illustrating the approximate relationship between the glycerol concentration and the soaking time in the aqueous glycerol mixture for a mineral aggregate containing swelling clay.

Amounts of crude oil as additive up to about 50%, by weight, of sulphur have been used successfully to produce materials with similar stress strain properties to asphaltic concretes (see plot 8 of FIG. 1).

As indicated previously the petroleum additive is considered part of the sulphur component in considering the relative amounts of sulphur and mineral aggregate in the sulphur compositions.

(b) Polyol Additive

The preferred polyol additive is glycerol but other polyols can be employed which exhibit low volatility at the temperatures to which the mineral aggregate is subjected in the manufacture of the sulphur composition.

In order to introduce the glycerol into the mineral aggregate containing swelling clay, the aggregate is soaked in a mixture of glycerol and water; the use of glycerol alone is difficult because it is a relatively viscous syrupy liquid.

The thus soaked aggregate is subsequently heated to drive off the water.

The period of soaking to provide adequate water resistance in the sulphur concrete or mortar depends on the ratio of water to glycerol in the soaking mixture. Water to glycerol ratios between 1:10 and 100:1 have been employed satisfactorily to provide water resistance in cements and mortars of the invention.

A water to glycerol ratio of 1:2 to 65:1 is generally preferred. The glycerol improves both the water resistance and the ductility.

Glycols are also useful in improving the water resistance of sulphur compositions that include swelling clay in the mineral aggregate, although they do not appear to improve the ductility. In this case the aggregate is suitably heated and the glycol added thereto and heated to drive off excess glycol.

Water Resistance

While the inventors do not wish to be bound by any theory as to the mechanism whereby the water resistance is obtained, it is believed, in the case of glycerol, that the glycerol molecules penetrate between the silicate layers of the swelling clay mineral and, in doing so, fix the spacing of these layers, so that further separation of the layers, such as would occur in uncontrolled swelling in water, does not take place.

The mechanism by which the petroleum additives improve water resistance is less certain, but is possible that, as in the case of glycerol, the additives may fix the spacing between the layers so that further separation resulting in disintegration does not occur. Alternatively, the additives may be adsorbed on external surfaces, rendering the mineral hydrophobic.

In any event it would appear that these additives are effective to prevent swelling of the swelling clay by water to the disintegration point and tests on sulphur concretes and mortars of the invention employing these additives show that resistance to water is achieved even under severe conditions. In particular cases, specimen concrete articles moulded from sulphur concretes of the invention were totally immersed in water and aqueous salt solutions for prolonged periods, without any disintegration of the specimen. By way of comparison corresponding articles in which no additive was employed, disintegrated rapidly, within a few minutes, on immersion in water.

Ductility

Certain of the additives of the invention improve the ductility of sulphur concretes, mortars and other sulphur bound composites, with or without a swelling clay in the mineral aggregate. In particular, the petroleum additives and glycerol are found to improve the ductility, the petroleum additives being especially preferred.

The relatively small amounts of the additives according to the invention produce a significant improvement in the ductility. The modulus of elasticity is reduced and greater strains at failure are obtained. Under strain controlled test conditions a descending branch may be obtained as for Portland cement concretes.

At maximum load the compositions of the invention continue to deform without failure. This is to be contrasted with sulphur compositions which do not include the additive, which shatter at maximum load.

Unmodified sulphur compositions typically fail and shatter at a strain up to about 2000 microstrains, whereas the sulphur compositions of the invention maintain load bearing properties at strains above 2000 microstrains and as high as 10,000 microstrains.

In this respect the sulphur concretes of the invention are somewhat similar to asphalt concretes in that both maintain load bearing properties at high strains. However, the asphalt concretes can support only low maximum loads in comparison with the sulphur concretes of the invention. In their ability to support high loads the sulphur concretes of the invention are somewhat similar to Portland cement concrete, but however, are not generally as strong and as stiff as Portland cement concretes and thereby form a class of materials varying from Portland cement concretes to asphaltic concretes in stress/strain behaviour. Sulphur concretes with similar and higher strengths to Portland cement concrete can also be made by suitable mix design.

Thus sulphur concretes of the invention display desirable properties of both Portland cement and asphaltic concretes, thereby providing a versatile material.

It is thought that the improvement in ductility may result from a change in the bond or bond behaviour between the sulphur and the aggregate and/or between sulphur crystals.

BRIEF DESCRIPTION OF THE DRAWINGS

The improved properties of the sulphur composition of the invention are illustrated by reference to the accompanying drawings in which.

EXAMPLES

EXAMPLE 1

A mineral aggregate comprising 22 lbs of coarse aggregate and 14.7 lbs of fine aggregate was heated in an oven at a temperature of 125° C. for a minimum of 4 hours.

The thus heated aggregate was introduced into a 1.5 cu. ft. mixer, externally heated to about 125° C., and the aggregate was mixed for about 4 minutes.

To the heated and mixed aggregate there was added, 10 lbs of molten sulphur at a temperature of about 125° C., 3.3 lbs of fly ash and 0.2 lbs of crude oil; and the mixing was maintained for a further 2 minutes in order to thoroughly mix the ingredients.

The resulting hot mixture was cast into a series of steel moulds at room temperature, and the moulds were vibrated on a vibrating table.

There was thus obtained a series of cylindrical specimens of sulphur concretes, the specimen cylinders having a length of 6" and a diameter of 3".

The procedure was repeated but omitting the addition of the crude oil to provide samples for comparison with the samples made according to the invention.

The sulphur concrete samples containing the crude oil additive displayed a marked improvement in ductility as compared with the comparison samples in which the additive was omitted.

The sulphur employed in the example was obtained from the Balzac Alberta Plant, the coarse and fine aggregate were obtained from the Consolidated Aggregate Pit, Bearspaw, Calgary; and the fly ash was obtained from the Western Plant, Edmonton, all in Alberta, Canada.

EXAMPLE 2

The procedure of Example 1 was repeated but employing an aggregate containing a small amount of swelling clay. The ductility results were similar to those in Example 1.

EXAMPLE 3

A mineral aggregate comprising 11 lbs of coarse aggregate and 7.3 lbs of fine aggregate was heated in an oven at a temperature of 125° C. for a minimum of 4 hours.

The thus heated aggregate was introduced into a 1.5 cu. ft. mixer, externally heated to about 125° C., and the aggregate was mixed for about 4 minutes.

To the heated and mixed aggregate there was added, 5 lbs of molten sulphur at a temperature of about 125° C. and 1.7 lbs of fly ash, and the mixture was mixed. To the resulting mixture there was added 0.05 lbs of crude oil; and the mixing was maintained for a further 2 minutes.

The resulting hot mixture was cast into a series of steel moulds at room temperature, and the moulds were vibrated on a vibrating table.

There was thus obtained a series of cylindrical specimens of sulphur concretes, the specimen cylinders having a length of 6" and a diameter of 3".

The procedure was repeated but employing 0.125 lbs of the crude oil to obtain further samples.

The procedure was repeated but omitting the addition of the crude oil to provide samples for comparison with the samples made according to the invention.

The improved ductility of the sulphur concrete specimens of the invention as compared with the comparison samples and similar specimens of Portland cement concrete, and asphalt concrete is shown graphically in FIG. 1.

In FIG. 1, plot 1, represents the results for the comparison samples of sulphur concrete containing no additive; plot 2 is a typical Portland cement concrete; plot 3 is a typical asphalt concrete; plot 4 is the sulphur concrete of the invention with the 0.05 lbs addition of crude oil; and plot 5 is the sulphur concrete of the invention with the 0.125 lbs addition of sulphur concrete.

The sulphur employed in the example was obtained from the Balzac Alberta Plant, the coarse and fine aggregate were obtained from the Consolidated Aggregate Pit, Bearspaw, Calgary; and the fly ash was obtained from the Western Plant, Edmonton, all in Alberta, Canada.

The crude oil was a Lloydminster Crude obtained from Gulf Oil, Calgary, however, comparable results were obtained using Truck Crude, Princess Crude and Light Refining Crude, respectively, all from Gulf Oil, Calgary; Gach Saran Crude (Iran), having an API of 30, obtained from Gulf Oil, Calgary; Lagomer (Venezuela) obtained from Shell Oil; and Cevta (Venezuela) having an API of 31, obtained from Gulf Oil.

EXAMPLE 4

A mineral aggregate comprising 11 lbs of coarse aggregate (Exshaw limestone) and 7.3 lbs of fine aggregate (Ottawa C-190 sand) was soaked with 0.125 lbs of crude oil for 6 hours and then heated in an oven for 16 hours at 150° C.

The thus heated aggregate was introduced into a 1.5 cu. ft. Monarch mixer, externally heated to about 125° C., and the aggregate was mixed for about 4 minutes.

To the heated and mixed aggregate there was added 5 lbs of molten sulphur at a temperature of about 125° C. and 1.7 lbs of fly ash and the mixing was maintained for a further two minutes.

The resulting hot mixture was cast into a series of steel moulds at room temperature, and the moulds were vibrated on a vibrating table.

There was thus obtained a series of cylindrical specimens of sulphur concretes having a length of 6" and a diameter of 3".

The procedure was repeated but employing 0.5 lbs and 2.325 lbs of crude oil respectively.

The improved ductility of the sulphur concretes is shown graphically in FIG. 1.

In FIG. 1, plot 6 is the sulphur concrete of the invention with the 0.125 lbs addition of crude oil; plot 7 is the sulphur concrete with the 0.5 lbs addition of crude oil; and plot 8 is the sulphur concrete with the 2.325 lbs addition of crude oil.

The fly ash was obtained from the Western Plant, Edmonton, Alberta, Canada.

EXAMPLE 5

The procedure of Example 2 was repeated except that the mixture was cast into 3"×6" cylinders and 11.5"×11.5"×10" prisms to provide sulphur concrete specimens of the invention.

The compression strength of the cylindrical specimens was determined on exposure to four different environments, with respect to time.

The modulus of rupture of the prismatic specimens was similarly determined with respect to time.

Figure 3A:
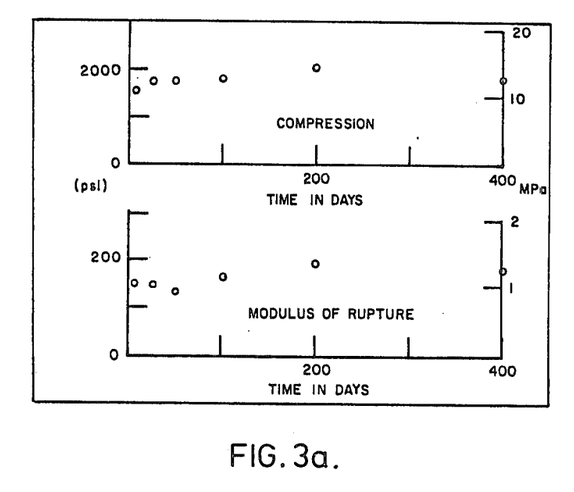
FIG. 3a, 3b, 3c, and 3d, illustrate graphically a series of plots of compressive strength and modulus of rupture, of specimen articles according to the invention, with time, during exposure to different environments.

FIG. 3a illustrates graphically the results in an environment of air at a temperature of 22° C.

Figure 3B:
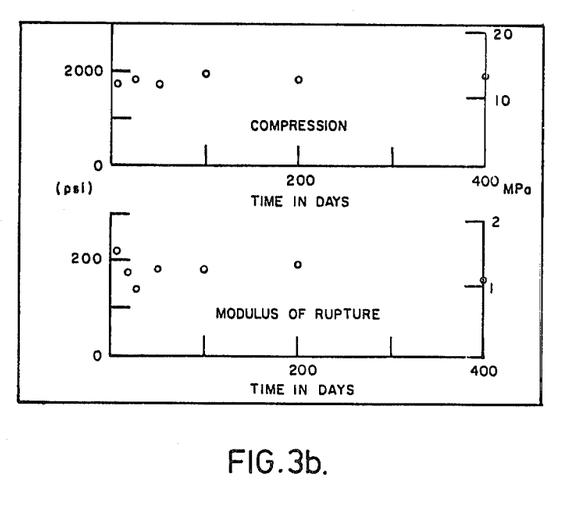

FIG. 3b illustrates graphically the results on immersion of the specimens in a 5% aqueous solution of sodium chloride.

Figure 3C:
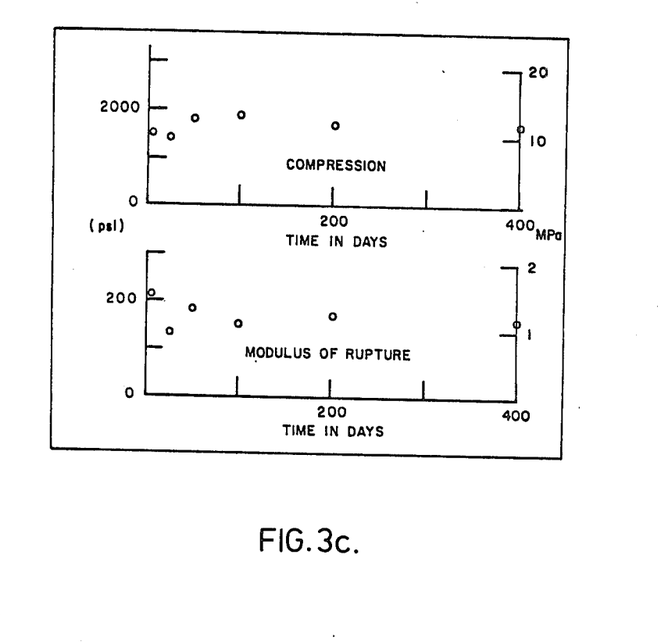

FIG. 3c illustrates graphically the results on immersion of the specimens in a 5% aqueous solution of calcium chloride.

Figure 3D:
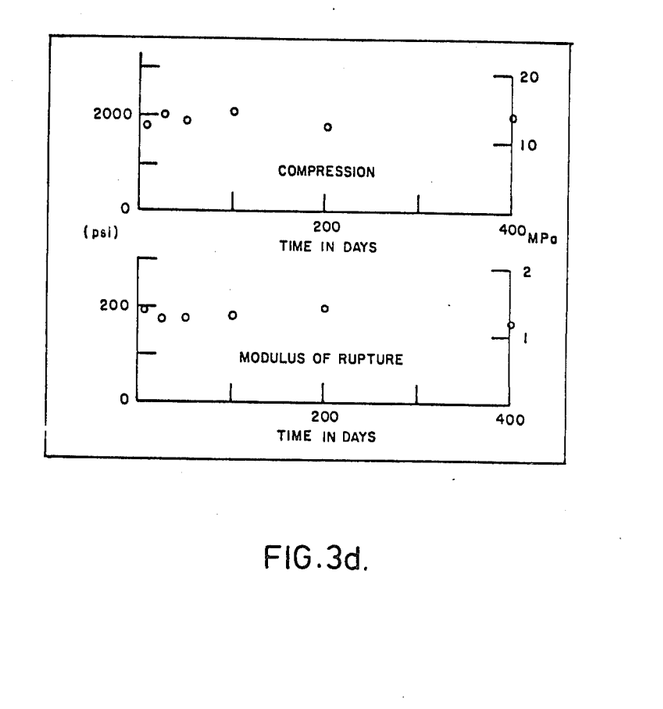

FIG. 3d illustrates graphically the results on immersion of the specimens in a saturated solution of magnesium sulphate.

As the results show, no measurable deterioration in the compressive strength or modulus of rupture occurred and the specimens remained intact thereby demonstrating the resistance to water and aqueous salt solutions. In contrast similar specimens made according to Example 2, but omitting the crude oil additive disintegrated in a few minutes, on immersion in water.

EXAMPLE 6

In a vessel there was combined 22 lbs of coarse aggregate and 14.7 lbs of fine aggregate, the aggregate containing a small amount of swelling clay, and the mixture was covered with an aqueous glycerol mixture composed of 3000 gms of water and 1500 gms of glycerol. The aggregate was allowed to soak in the mixture for 24 hours whereafter the aggregate was removed and heated for a minimum of 4 hours in an oven maintained at a temperature of 125° C.

Thereafter the procedure outlined in Example 1 was followed but with omission of the crude oil addition.

The thus obtained specimens were immersed in water for prolonged periods without any visible disintegration.

The stress-strain behaviour of the concrete was similar to that of the concretes of Examples 1, 2, 3 and 4.

EXAMPLE 7

7.5 lbs of sand containing a small amount of swelling clay were heated in an oven to 125° C. and separately 9.7 lbs of sulphur was heated to 125° C. in an 8 qt. melting pot.

4.8 lbs of fly ash were added to the molten sulphur and thoroughly mixed to a creamy, smooth texture. The heated sand and 0.2 lbs of crude oil were added to the melting pot and the combined contents of the pot were thoroughly mixed, while the temperature was maintained. A ⅜" hand drill with a mixing blade attached was used for mixing.

The resulting hot mixture was cast into a steel mould, the mould being at room temperature, and the mould was vibrated on a vibration table.

There was thus obtained a sulphur mortar which displayed ductility and water resistance characteristics similar to the sulphur concretes in Examples 1 to 4. The cast sulphur mortar was readily revitalized for moulding or coating by heating it to a temperature at which sulphur is molten.

The sulphur was obtained from the Balzac Alberta Plant; the sand was Ottawa Silica C190 sand; and the fly ash was obtained from Western Plant, Edmonton, Alberta.

EXAMPLE 8

7.7 lbs of coarse aggregate and 15.6 lbs of fine aggregate were heated in an oven overnight to 125° C. The aggregates were from Trail, B.C., supplied by Cominco Ltd. The fine aggregate was within ASTM C33 specifications for fine aggregates and the coarse within the limits of SPR 8 (ASTM C33) for coarse aggregate. The aggregates were mixed with 5.1 lbs of molten sulphur and 0.1 lbs of Lloydminster crude oil were added to the mix.

After casting into steel moulds, vibration, demoulding and capping specimens were tested and gave similar results to those for the improved ductile sulphur concretes in FIG. 1.

Similar results were obtained when Princess crude was used.

EXAMPLE 9

44 lbs of coarse aggregate contaminated with swelling clay were heated to 130° C. This was divided into four equal batches of 11 lbs. Each batch was subjected to treatment of a different quantity of polyethylene glycol as follows. The first batch was placed in a preheated mixer with 7.3 lbs of fine aggregate also preheated to 130° C. 25 ml of glycol were added and mixed for 2 minutes. 5 lbs of molten sulphur and 1.7 lbs of flyash were added. Mixing occurred for a further two minutes after which 3" diameter by 6" long specimens were cast. The same procedure was repeated for the remaining batches of coarse aggregate except that in each case the quantity of glycol added varied—viz 50 ml, 100 ml and 150 ml.

On immersing specimens in water, those of mixes to which only 25 or 50 ml of glycol were added cracked within one day whereas those of mixes to which 100 or 150 ml glycol were added remain intact.

EXAMPLE 10

11 lbs of coarse aggregate containing a small amount of swelling clay and 7.3 lbs of sand were heated overnight to 125° C. and the heated aggregate was added to a 1.5 cu. ft. concrete mixer. There was then added 500 ml of Varsol (trademark), 5 lbs of molten sulphur and 1.7 lbs of fly ash and the mixture was thoroughly mixed. The mixture was cast in the same manner as in Example 5. The resulting samples did not disintegrate when immersed in water for prolonged periods.

EXAMPLE 11

This example describes a series of mixes, each with 11 lbs of coarse aggregate contaminated with swelling clay (Consolidated Aggregate Co., Calgary), 7.3 lbs of Ottawa sand, 1.7 lbs of fly ash and 5 lbs of molten sulphur.

In each mix the coarse aggregate and sand were preheated to 130° C. In the first set of mixes, 0.05 lbs of crude oil were added to the mix either (a) immediately after the aggregates were added (i.e. before the fly ash and sulphur) or (b) after all other mix components were added. In each instance mixing occurred for either 1 or 10 minutes before the addition of more components (in case (a)) or casting (in case (b)). After casting specimens were immersed in water. All specimens cracked within a few days.

In the second set of tests 0.25 lbs of crude oil were used in the same way as the 0.05 lbs of the previous set. With 0.25 lbs, specimens of type (a) mixed for either 1 or 10 minutes remained intact on immersion in water. Specimens of type (b) with 1 minute mixing, cracked after 1 day immersion; whereas those with 10 minutes mixing cracked after 1 week.

These examples demonstrate that adequate mixing and an adequate content of crude oil are necessary for good water resistance.

It will be recognized that the immersion test represents conditions perhaps more severe than would generally be encountered.

EXAMPLE 12

A series of examples were carried out in which various variables were modified. The ductility results are summarized in Table I below.

It will be seen that the sequence and length of time of mixing produced no apparent difference in the improved ductility. Different crude oils improved the ductility as did the heavier fractions and residuum, but the lighter cuts having a predominantly paraffin content did not improve ductility. Simple aromatic solvents alone did not improve ductility.

EXAMPLE 13

A series of concrete specimens were prepared, employing the general procedure of Example 1, containing 3% bentonite by weight of aggregate.

The mixture comprised sulphur, flyash, fine aggregate, coarse aggregate in a ratio of 1:0.34:1.46:2.20, by weight.

When no additive was present, the specimens, when placed in water, disintegrated completely within 24 hours. Specimens, containing 5%, by weight, based on the weight of sulphur, of additive (Lloydminster crude) showed no visible cracks after 2 months in water. However, tests on strength show that the specimens suffered some loss in strength, and also that the time of exposure of the aggregate to the crude oil additive is significant.

The crude oil was added to the mix before and after the sulphur, in different tests, and the mixing was subsequently carried out for various times ranging from 2 to 60 minutes. The sequence of adding the crude (i.e. before or after the sulphur) was not found to be important but a mixing time of 30 minutes or more was needed to ensure that the loss in strength was reasonably small; with mixing times of 2, 5 and 10 minutes the strength was less than 50% of the value for specimens that were not immersed in water. For mixing times of 30 and 60 minutes the strengths were similar to those of specimens not immersed in water.

ticular effects, for example a fire or flame retardant agent can be incorporated into the composition.

TABLE I

DUCTILITY

| Test Variable | Test Done | Result |
|---|---|---|
| Order of mix | (i) Sulphur/agg. then crude<br>(ii) Crude/agg. then sulphur<br>(iii) Crude/sulphur then agg. | All exhibit improved ductility |
| Time of mix | (a) Mix crude/agg. for 2, 5, 10, 30, 60, minutes. Add sulphur, mix 2 mins. (b) Mix crude/agg. for 2 mins. Add sulphur and mix for 2, 5, 10, 30, 60 minutes. | All exhibit improved ductility with no difference |
| Percentage of crude oil (by volume of sulphur) | Amounts .25% by volume to 90% by volume of crude oil were employed | Increase % crude, lower strength and mod. elasticity |
| Types of crude | Lloydminster<br>Princess<br>Truck<br>LRC } Canada<br><br>Gach Saran (Iran)<br>Lagomar, Cevta (Venezuela) | No apparent difference between crudes |
| Cuts of crude | Crude oil, pitch, fuel oil, stove oil, platformate. | First three exhibit improved ductility, last two no improvement. |
| Cuts of crude (% by weight of sulphur) | 5% stove oil | No improvement in ductility |
| | 5% heavy fuel | Improved ductility |
| | 5% resin/ asphaltenes fraction mixture | Improved ductility |
| | 5% asphalt stripper bottoms (impure asphaltenes) | Slight improvement in ductility |
| | 5% maltenes | Improved ductility |
| Polyols | Glycerol, poly ethylene glycol | Glycerol produces improved ductility, polyethylene glycol provided no improvement |
| Varsol | | No improvement in ductility |
| Simple aromatics (% by weight of sulphur) | 5% toluene | No improvement in ductility |
| | 5% benzene | No improvement in ductility |
| | 5% xylene | No improvement in ductility |
| | 5%* Cyclo Sol 63 | No improvement in ductility |
| | 5%* Cyclo Sol 53 | No improvement in ductility |
| Pentane soluble residuum fraction (maltenes) (% by weight of sulphur) | 5% maltenes | Improvement in ductility |

*Cyclo Sol is a trademark of Shell Chemical Co. for hydrocarbon solvents composed of 50 to 99% aromatic hydrocarbons.

It will be recognized that the compositions can be modified to introduce other ingredients to achieve particular effects,

We claim:

1. A hot-mouldable, water-resistant, composition comprising a mixture of mineral aggregate contaminated with swelling clay, sulphur in an amount effective to bind said aggregate and a petroleum or polyol additive effective to prevent disintegration of the composition in the presence of water.

2. A concrete composition according to claim 1, comprising in wt %, 5 to 20% of sulphur; 15 to 80% of coarse aggregate; 5 to 85% of fine aggregate; and 5 to 15% of fines to a total of 100%; said aggregate including 0.1 to 5%, by weight of total aggregate of swelling clay; and said additive comprising crude oil in an amount of 0.1 to 50%, by weight, based on the weight of sulphur, as part of the sulphur component.

3. A concrete composition according to claim 2, wherein said crude oil is present in an amount of 0.5 to 10%, by weight, based on the weight of sulphur, as part of the sulphur component.

4. A concrete composition according to claim 1, wherein said additive comprises a fraction of crude oil fractionated above 250° C.

5. A concrete composition according to claim 1, wherein said additive is a crude oil having a Characterization Factor up to about 12.

6. A concrete composition according to claim 1, wherein said additive comprises glycerol.

7. A water resistant, moulded concrete article of improved ductility comprising a particulate mineral aggregate contaminated with swelling clay, the particles of said aggregate being bonded together with sulphur, and a petroleum or polyol additive effective to prevent disintegration of concrete in the presence of water and to render the concrete ductile.

8. A concrete article according to claim 7, containing about 1 to about 5%, by volume, of voids.

9. A concrete article according to claim 7, comprising, in wt. %, 5 to 20% of sulphur; 15 to 80% of coarse aggregate; 5 to 85% of fine aggregate; and 5 to 15% of fines to a total of 100%; said aggegate including 0.1 to 5%, by weight of total aggregate, of swelling clay; and said additive comprising crude oil in an amount of 0.1 to 50%, by weight, based on the weight of sulphur, as part of the sulphur component.

10. A concrete article according to claim 9, wherein said crude oil is present in an amount of 0.5 to 10% by weight, based on the weight of sulphur, as part of the sulphur component.

11. A concrete article according to claim 7, wherein said additive comprises glycerol.

12. A remeltable water-resistant mortar of improved ductility comprising a particulate mineral aggregate contaminated with swelling clay, the particles of said aggregate being bonded together with sulphur; and a petroleum or polyol additive effective to prevent disintegration of the mortar in the presence of water and to render the mortar ductile.

13. A mortar according to claim 12, wherein said aggregate is composed of fine aggregate having a particle size of about 150 μm to about 4.75 mm and fines having a particle size less than about 150 μm, said aggregate containing 0.1 to 5%, by weight, of swelling clay; said additive comprising crude oil in an amount of 0.1 to 50%, by weight based on the weight of sulphur.

14. A mortar according to claim 13, wherein said crude oil is present in an amount of 0.5 to 10%, by weight, based on the weight of sulphur, as part of the sulphur component.

15. A mortar according to claim 13, comprising 20 to 60%, by weight, of said sulphur and 40 to 80% of said mineral aggregate; said aggregate comprising 30 to 70%, by weight, of said fine aggregate and 30 to 70%, by weight of said fines to a total of 100%, based on the total weight of mineral aggregate.

16. A pavement structure or portion thereof formed from a composition as defined in claim 1.

17. A hot-mouldable, construction composition comprising a mineral aggregate, sulphur in an amount effective to bond said aggregate and a petroleum or polyol additive effective to render said composition ductile.

18. A composition according to claim 17, having load bearing properties at strains above 2000 microstrains.

19. A hot-mouldable ductile construction composition comprising a mineral aggregate, sulphur in an amount effective to bond said aggregate and an additive selected from the group consisting of crude oil, the pentane soluble maltene fraction of crude oil, the residuum from fractional distillation of crude oil, and the crude oil fractions distilling above 250° C.; said additive being present in an amount of 0.1 to 50%, by weight based on the weight of sulphur.

20. A composition according to claim 19, wherein said additive is present in an amount of 0.5 to 10%, by weight, based on the weight of sulphur, as part of the sulphur component.

21. A composition according to claim 19, comprising, in wt. % 5 to 20% of sulphur; 15 to 80% of coarse aggregate; 5 to 85% of fine aggregate; and 5 to 15% of fines to a total of 100%, said additive being part of the sulphur component.

22. A composition according to claim 21, characterized in that it withstands, without shattering, load at strains in the range of 2000 to 10,000 microstrains.

23. A composition according to claim 22, wherein said additive comprises crude oil having a Characterization Factor up to about 12 in an amount of 0.5 to 10%, by weight, based on the weight of sulphur.

24. A composition according to claim 19, wherein said additive comprises crude oil having a Characterization Factor up to about 12.

25. A composition according to claim 1, wherein said mineral aggregate comprises natural soil.

26. A process for the preparation of a moulded concrete article which comprises
   forming a mixture at a temperature below 159° C. comprising a particulate mineral aggregate, molten sulphur in an amount effective to bond the aggregate particles and a petroleum or polyol additive effective to render the concrete ductile,
   thoroughly mixing the mixture to a substantially homogeneous state, and
   casting the hot mixture in a desired shape.

27. A process according to claim 26, wherein said aggregate contains a swelling clay, and said additive is present in an amount effective to prevent disintegration of the concrete in the presence of water.

28. A process according to claim 26, wherein said forming comprises mixing coarse mineral aggregate and fine mineral aggregate as part of said particulate aggregate, heating the aggregate mixture to a temperature of 120° C. to 130° C., mixing the resulting heated aggregate with molten sulphur at a temperature below 159° C., and fines as part of said particulate mineral aggregate and adding crude oil as said additive.

29. A process according to claim 28, wherein said crude oil is present in an amount of 0.1 to 50%, by weight, based on the weight of sulphur.

30. A process according to claim 29, wherein said crude oil amount is 0.5 to 10% by weight, based on the weight of sulphur.

31. A process according to claim 29, wherein said crude oil has a Characterization Factor up to about 12.

32. A process according to claim 29, wherein said concrete comprises, in wt. %, based on the weight of sulphur and mineral aggregate to a total of 100%:
5 to 20% of sulphur,
15 to 80% of coarse aggregate,
5 to 85% of fine aggregate, and
5 to 15% of fines.

33. A process according to claim 26, wherein said petroleum additive comprises a crude oil fraction distilling above 250° C.

34. A process according to claim 26, wherein said forming comprises
mixing coarse mineral aggregate and fine mineral aggregate as part of said particulate aggregate;
soaking the resulting aggregate mixture in a mixture of water and glycerol, in a water to glycerol ratio of between 1:10 and 100:1;
recovering the thus soaked aggregate, heating to a temperature of 120° C. to 130° C. to drive off the water, and
mixing the resulting heated aggregate with molten sulphur at a temperature below 159° C., and fines as part of said particulate mineral aggregate.

35. A process according to claim 34, wherein said concrete comprises, in wt. %, based on the weight of sulphur and mineral aggregate to a total of 100%:
5 to 20% of sulphur,
15 to 80% of coarse aggregate,
5 to 85% of fine aggregate, and 5 to 15% of fines.

36. A process according to claim 26, wherein said forming comprises
soaking at least a part of the aggregate with a polyol,
recovering the thus soaked aggregate, heating to drive off excess polyol, and
mixing the resulting heated aggregate with molten sulphur at a temperature below 159° C.

37. A method of rendering a sulphur concrete having a composition comprising sulphur and a mineral aggregate containing swelling clay, water-resistant, which comprises incorporating in said composition an additive selected from the group consisting of crude oil, the pentane soluble maltene fraction of crude oil, the residuum of fractional distillation of crude oil, and the crude oil fraction distilling above 250° C. in an amount of 0.1 to 50%, by weight of the sulphur.

38. A method according to claim 37, wherein said additive is present in an amount of 0.5 to 10%, by weight, of the sulphur.

39. A method according to claim 37, wherein said additive is a crude oil having a Characterization Factor up to about 12.

40. A composition according to claim 1, 7 or 12, which further comprises a sulphur modifier effective to impart a degree of plasticity to the sulphur.

41. A composition according to claim 17, 19 or 26, which further comprises a sulphur modifier effective to impart a degree of plasticity to the sulphur.

42. A composition according to claim 37, which further comprises a sulphur modifier effective to impart a degree of plasticity to the sulphur.

43. A composition according to claim 1, 7 or 12, which further comprises a flame retardant.

44. A composition according to claim 17, 19 or 26, which further comprises a flame retardant.

45. A composition according to claim 37, which further comprises a flame retardant.

46. A composition according to claim 1, 7 or 12, which further comprises a sulphur modifier effective to impart a degree of plasticity to the sulphur and a flame retardant.

47. A composition according to claim 17, 19 or 26, which further comprises a sulphur modifier effective to impart a degree of plasticity to the sulphur and a flame retardant.

48. A composition according to claim 37, which further comprises a sulphur modifier effective to impart a degree of plasticity to the sulphur and a flame retardant.

* * * * *

UNITED STATES PATENT OFFICE
CERTIFICATE OF CORRECTION

Patent No. 4,188,230    Dated February 12, 1980

Inventor(s) Jack E. GILLOTT; Ian J. JORDAAN, Robert E. LOOV and Nigel G. SHRIVE

It is certified that error appears in the above-identified patent and that said Letters Patent are hereby corrected as shown below:

COVER PAGE, under ASSIGNEE: Kindly delete "SULPHUR DEVELOPMENT INSTITUTE OF CANADA and insert instead -- SULPHUR DEVELOPMENT INSTITUTE OF CANADA (SUDIC) --.

Column 2, line 12, kindly delete "Dueker" and insert instead -- Duecker --.

Column 2, line 25, kindly delete "orthohombic" and insert instead -- orthorhombic --.

Column 4, line 12, kindly delete "trowled" and insert instead -- troweled --.

UNITED STATES PATENT OFFICE
CERTIFICATE OF CORRECTION

Patent No. 4,188,230　　　　　Dated February 12, 1980

Inventor(s) Jack E. GILLOTT; Ian J. JORDAAN; Robert E. LOOV and Nigel G. SHRIVE

It is certified that error appears in the above-identified patent and that said Letters Patent are hereby corrected as shown below:

Column 8, line 30, kindly delete "of" (second occurrence) and insert instead -- or --.

Column 9, line 5, kindly delete the entire formula and insert instead
$$CF = \sqrt[3]{T_B/S}.$$

Column 11, line 14, kindly delete "is" (second occurrence) and insert instead -- it --.

Column 13, line 49, kindly delete "Lagomer" and insert instead -- Lagomar --.

Column 22, line 10, kindly delete "fraction" and insert -- fractions --.

Signed and Sealed this

Fifteenth Day of July 1980

[SEAL]

Attest:

SIDNEY A. DIAMOND

Attesting Officer　　Commissioner of Patents and Trademarks

UNITED STATES PATENT OFFICE
CERTIFICATE OF CORRECTION

Patent No. 4,188,230         Dated February 12, 1980

Inventor(s) Jack E. GILLOTT, Ian J. JORDAAN, Robert E. LOOV and Nigel G. SHRIVE

It is certified that error appears in the above-identified patent and that said Letters Patent are hereby corrected as shown below:

In Column 13, line 37, please delete "sulphur concrete" and insert instead --crude oil--.

Signed and Sealed this

Seventh Day of October 1980

[SEAL]

*Attest:*

SIDNEY A. DIAMOND

*Attesting Officer*    *Commissioner of Patents and Trademarks*